No. 639,543. Patented Dec. 19, 1899.
J. W. EISENHUTH.
WHEEL.
(Application filed Aug. 31, 1899.)
(No Model.)
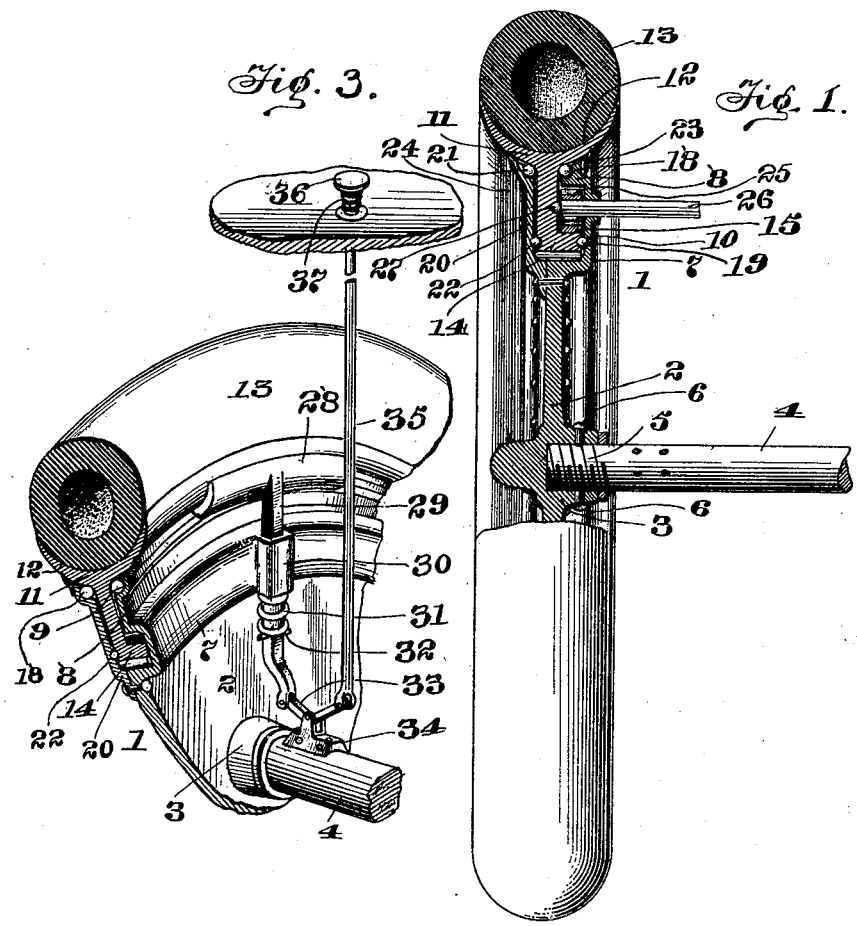
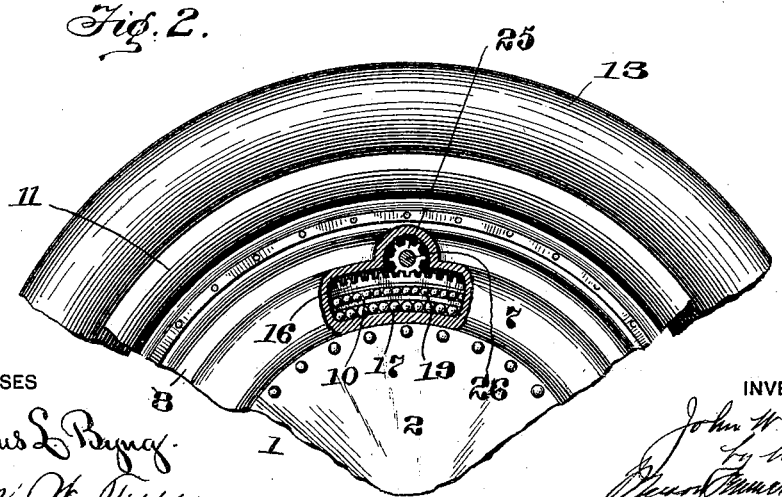
WITNESSES
INVENTOR

UNITED STATES PATENT OFFICE.

JOHN W. EISENHUTH, OF NEW YORK, N. Y.

WHEEL.

SPECIFICATION forming part of Letters Patent No. 639,543, dated December 19, 1899.

Application filed August 31, 1899. Serial No. 729,057. (No model.)

*To all whom it may concern:*

Be it known that I, JOHN W. EISENHUTH, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

My invention relates to improvements in wheels, and particularly to wheels which are adapted to be used for actuating or driving vehicles of various kinds.

The invention consists in a wheel having a stationary hub portion, a revoluble rim portion, ball-bearings interposed between the hub and the rim, a removable disk for holding the rim and ball-bearings in place upon the said hub, a rack secured to the rim portion, and a pinion for actuating the said rack to drive or rotate the rim of the wheel.

It also consists in certain other novel constructions, combinations, and arrangements of parts, as will be hereinafter fully described and claimed.

In the accompanying drawings, Figure 1 represents a vertical transverse section through a wheel constructed in accordance with my invention, a portion of the said wheel being shown in elevation. Fig. 2 represents a detail fragmentary view of a portion of the said wheel in side elevation, a part being broken away and sectioned to show the position of the rack and its driving-pinion; and Fig. 3 represents a detail perspective view of a portion of the said wheel, illustrating the means for braking the same.

Wheels of this type, while being well adapted for all styles of vehicles, are particularly well adapted for driving motor-vehicles and similar mechanisms. This is so because the central portion or disk of the wheel is held stationary and rigid with the frame, and therefore is not likely to twist or get out of alinement. The rim of a wheel thus constructed can therefore be driven by gearing with less friction than if the wheel were subjected to a greater twisting and binding action.

In carrying out the features of my invention the central portion of the wheel 1 is formed in the shape of a disk, as 2, which carries the hub 3 of the wheel. The hub is preferably recessed, so as to receive the axle 4 of the vehicle, to which it is rigidly secured. This may be accomplished by securing the axle in the hub, as shown at 5 in the drawings, and additional security may be obtained by the use of rivets or bolts, as 6 6. Near the periphery of the hub-disk 2 is formed an annular recessed portion, as 7, extending entirely around the disk. A peripheral portion 8 is also formed outside of the recessed portion 7, the said peripheral portion being provided with a bearing-groove forming a part of a ball-race, as at 9. The recessed portion 7 is also provided upon its inner face with a groove 10 for forming part of the ball-race. The rim portion of the wheel, as 11, is preferably provided with an outwardly-facing groove 12 for receiving any suitable tire, as 13, so that rubber tires or hollow inflated tires may be used, as may be found most desirable and lasting. The rim 11 is provided upon its inner periphery with an offset portion or annular flange, as 14, which extends into the recessed portion 7 of the hub-disk. Secured to the annular projection 14 is a collar or ring 15, provided with gear-teeth, forming a rack, as 16. This ring, carrying the rack 16, is rigidly secured to the flange 14 of the rim, so that by actuating the said rack the rim of the wheel may be turned. A series of roller-bearings, as 17 17, is preferably interposed between the rim 11 and the hub-disk 2, so as to prevent any friction between the two parts. Bearing-grooves are also formed in the said rim to coincide with the grooves 9 and 10 of the hub-disk, so that ball-bearings may be interposed between the rim and the disk, as at 18 19, to insure an antifriction engagement at these points. In order to hold the rim in place against the wheel-disk, an outer ring, as 20, is applied outside the rim and rigidly secured by bolts or rivets to the hub-disk 2. Suitable ball-races are formed between this ring and the rim 11 and ball-bearings, as at 21 22, interposed between the parts. Dust-rings, as 23 24, may be applied to the edges of the hub-disk and the outer ring 20 to prevent dust getting between the rim and the said parts and reaching the ball-bearings. In order to actuate the rim 11, a pinion, as 25 25, is suitably mounted in an enlargement formed upon the hub-disk 2, so as to engage the rack 16. This pinion is secured to any suitable shafting, as 26, which may be driven by any desired motor or other power mechanism. Interposed between the end of the shaft 26 and the rim 11 is a single ball, as 27, so that all friction will be eliminated at this point. In driving a wheel of this character power is applied to the shaft, as 26, which is communicated through the pinion 25 and the rack 16 to the rim 11. It will be seen that the parts are so constructed that great power may be applied to the said rim without twisting it out of position and causing a binding action in the driving-gearing.

An important feature of my invention also is the means for stopping the revolutions of a rim of this character. I accomplish this purpose by means of a braking mechanism comprising a brake-shoe 28, adapted to engage one of the flanges of the revoluble rim 11. This brake-shoe is carried by a bolt or bar 29, which slides in a bearing 30, secured to the hub-disk. A spring, as 31, interposed between the bearing 30 and a pin or projection 32, secured to the bolt 29, normally holds the shoe away from and out of engagement with the said rim. In order to apply the brake, the bolt 29 is pivotally secured to a lever 33, the said lever being fulcrumed upon a bracket 34, secured to a shaft of the wheel. The other end of the said lever 33 is pivotally secured to an operating-rod 35, which preferably extends up through the flooring of the vehicle and is provided with a foot-engaging head, as 36. To assist in raising the rod, a coil-spring, as 37, may be interposed between the flooring and the head 36. It will be apparent that by placing the foot upon the head 36 the brake may be applied to the rim of the wheel with greater or less power, as may be required to stop its revolution.

It will be evident from the above description that by my improvement I am enabled to construct wheels for driving vehicles which shall be strong and yet simple in construction and which will not readily cause binding in the driving-gearing, and also that I am enabled to keep the same under perfect control by means of my improved braking mechanism.

Having now described my invention, what I claim as new, and desire to secure by Letters Patent, is—

1. A wheel for driving vehicles comprising a hub-disk rigidly secured to the frame of the vehicle, a revoluble rim adapted to move with respect to the said hub-disk, a rack carried by the said rim, an annular rack-inclosing portion formed on the said disk and covering said rack, means for actuating the said rack, and ball-bearings for reducing the friction between the rim and the said hub-disk, substantially as described.

2. In a wheel for driving vehicles, the combination of a stationary hub-disk formed with an annular gear-inclosing recess near its periphery, a revoluble rim having an annular projection upon its inner periphery adapted to engage the said recess on the hub-disk, a ring carrying a rack secured to the said annular projection, and traveling in said annular recess, gearing for engaging and actuating the said rack in order to cause the said rim to revolve, ball-bearings interposed between the rim and the disk, and roller-bearings interposed between the said annular projection and the said disk to reduce friction, substantially as described.

3. A wheel for driving vehicles comprising in its construction a hub-disk rigidly secured to the frame of a vehicle, the said disk being provided with a recess near its periphery, a revoluble rim adapted to engage the hub-disk, an annular flange formed upon the said rim and projecting into the recess upon the hub-disk, a rack secured upon the said annular flange, a pinion for engaging the said rack to actuate it, a shaft carrying said pinion and connecting it with any motive power, a single ball mounted between the rim and the said shaft, ball-races formed between the rim and the said disk to receive antifrictional ball-bearings, an outer securing-ring for holding the rim in place with respect to the disk, ball-bearings interposed between the said ring and the said rim, and dust-excluding rings applied upon the said disk, and the said ring for keeping dust out of the bearings, substantially as described.

4. A brake for rim-actuated wheels comprising a brake-shoe, a bolt carrying the same, a lever secured to the axle of the wheel and a rod for actuating the said lever and applying the brake against the rim of the wheel, substantially as described.

5. In a brake for rim-actuated wheels, the combination with a brake-shoe, of a sliding bolt carrying the same, a bearing upon the stationary central portion of the wheel for holding and guiding the said bolt, a spring for holding the shoe normally away from the rim, a bent lever fulcrumed upon the shaft of the wheel, an operating-rod engaging the said lever, said operating-rod extending to a suitable position in the vehicle-flooring, a head carried by the said rod and a spring for holding the rod normally upwardly, the construction being such that by pressing upon the head, the rod may be depressed and the brake-shoe forced against the rim of the wheel, substantially as described.

In testimony whereof I hereunto affix my signature in presence of two witnesses.

JOHN W. EISENHUTH.

Witnesses:
CHARLES H. GRAHAM,
VAN BUREN LAMB.